United States Patent
Camenisch et al.

(10) Patent No.: US 9,882,890 B2
(45) Date of Patent: *Jan. 30, 2018

(54) REISSUE OF CRYPTOGRAPHIC CREDENTIALS

(71) Applicant: International Business Machines Corporation, Armonk, NY (US)

(72) Inventors: Jan Camenisch, Thalwil (CH); Anja Lehmann, Zurich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,277

(22) Filed: May 26, 2016

(65) Prior Publication Data
US 2016/0269397 A1    Sep. 15, 2016

Related U.S. Application Data

(63) Continuation of application No. 14/439,955, filed as application No. PCT/IB2013/059267 on Oct. 10, 2013, now Pat. No. 9,385,872.

(30) Foreign Application Priority Data

Oct. 30, 2012    (EP) .................................... 12190498

(51) Int. Cl.
*H04L 29/06*    (2006.01)
*H04L 9/32*    (2006.01)

(52) U.S. Cl.
CPC ........ *H04L 63/0823* (2013.01); *H04L 9/3221* (2013.01); *H04L 9/3257* (2013.01);
(Continued)

(58) Field of Classification Search
CPC .. H04L 9/3263; H04L 63/0823; H04L 63/062
See application file for complete search history.

(56) References Cited

U.S. PATENT DOCUMENTS 7,591,412 B2    9/2009    Spaeth et al.
7,600,129 B2    10/2009    Libin et al.
(Continued)

FOREIGN PATENT DOCUMENTS

CN    1725684 A    1/2006
CN    101193103 A    6/2008
(Continued)

OTHER PUBLICATIONS

International Application No. PCT/IB2013/059267, Search Report and Written Opinion, dated Apr. 16, 2014, 15 pages.
(Continued)

*Primary Examiner* — Jason K Gee
(74) *Attorney, Agent, or Firm* — Scott S. Dobson

(57)    ABSTRACT

Effecting reissue in a data processing system of a cryptographic credential certifying a set of attributes, the credential being initially bound to a first secret key stored in a first processing device. A backup token is produced using the first device and comprises a commitment to said set of attributes and proof data permitting verification that the set of attributes in said commitment corresponds to the set of attributes certified by said credential. At a second processing device, a second secret key is stored and blinded to produce a blinded key. A credential template token produced from the backup token and the blinded key is sent to a credential issuer where said verification is performed using the proof data and the credential template token is used to provide a reissued credential, certifying said set of attributes, to the second device, the reissued credential being bound to the second secret key.

17 Claims, 3 Drawing Sheets

Figure 1:
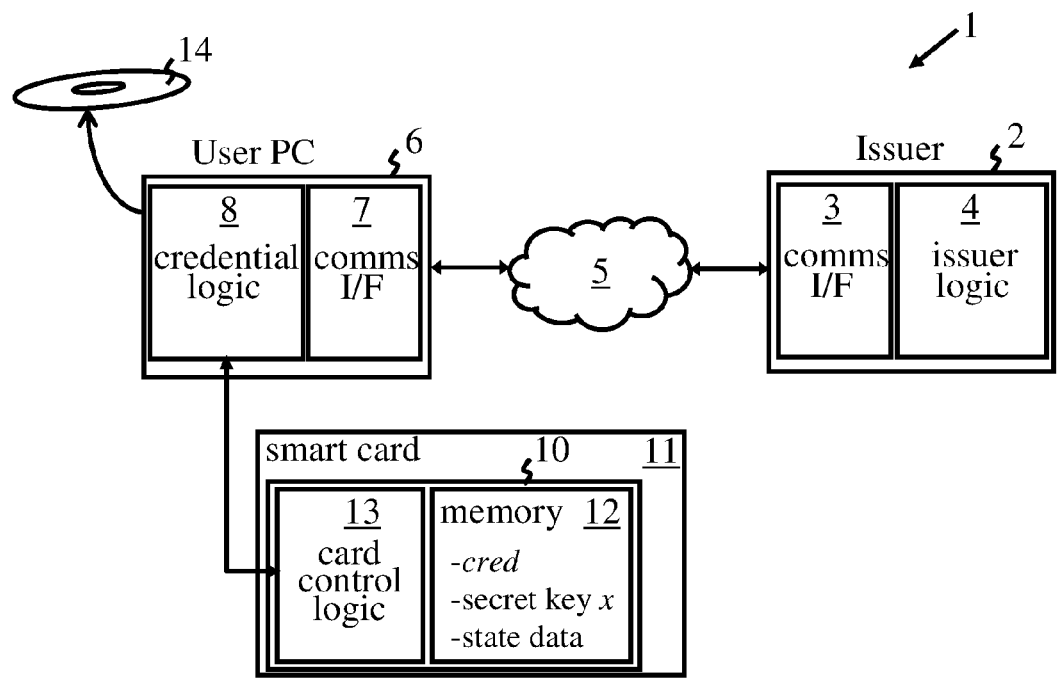

(52) U.S. Cl.
CPC ........ H04L 63/061 (2013.01); H04L 63/0807 (2013.01); H04L 2209/42 (2013.01)

(56) References Cited

U.S. PATENT DOCUMENTS

| | | | |
|---|---|---|---|
| 8,127,143 B2 | 2/2012 | Abdallah et al. | |
| 8,281,149 B2 | 10/2012 | Laurie et al. | |
| 2004/0148505 A1* | 7/2004 | Qiu | G06F 21/33 713/175 |
| 2005/0044386 A1* | 2/2005 | Libin | H04L 9/00 713/185 |
| 2010/0325441 A1 | 12/2010 | Laurie et al. | |
| 2013/0007869 A1* | 1/2013 | Thomas | G06F 21/335 726/9 |
| 2013/0132717 A1* | 5/2013 | Brand | H04L 9/0825 713/156 |
| 2015/0280924 A1 | 10/2015 | Camenisch et al. | |

FOREIGN PATENT DOCUMENTS

| | | |
|---|---|---|
| EP | 1322088 A2 | 6/2003 |
| WO | 2011103634 A1 | 9/2011 |

OTHER PUBLICATIONS

Kostiainen et al., "Towards User-Friendly Credential Transfer on Open Credential Platforms", ACNS 2011, LNCS 5715, pp. 395-412, 2011. Copyright Springer-Verlag Berlin Heidelberg 2011.

Kostiainen et al., "Credential Disabling from Trusted Execution Environments", NordSec 2010, LNCS 7127, pp. 171-186, 2012. Copyright Springer-Verlag Berlin Heidelberg 2012.

Camensich, J., "ABC4Trust & PrimeLife Tutorial: Part IV: Use Cases and 2nd Demo", IBM Research, Zurich, Jun. 10, 2011, 23 pages.

Camenisch et al., "D2.1 Architecture for Attribute-based Credential Technologies—Version 1", Attribute-Based Credentials for Trust, ABC4Trust, Jan. 12, 2011, 105 pages.

Baldimtsi et al., "Anonymous Credentials Light", CCS'13, Nov. 4-8, 2013, Berlin, Germany. Copyright 2013 ACM, 12 pages. http://http://dx.doi.org/10.1145/2508859.2516687.

Camenisch et al., "Efficient Attributes for Anonymous Credentials", ACM Transactions on Information and System Security, vol. 15, No. 1, Article 4, Publication date: Mar. 2012, 30 pages. DOI 10.1145/2133375.2133379. http://doi.acm.org/10.1145/2133375.2133379.

Camenisch et al., "Efficient Group Signature Schemes for Large Groups", Advances in Cryptology—CRYPTO '97, pp. 410-424. Copyright Springer-Verlag Berlin Heidelberg. DOI: 10.1007/BFb0052252.

Fiat et al., "How to Prove Yourself: Practical Solutions to Identification and Signature Problems", Advances in Cryptology—CRYPTO '86, pp. 186-194. Copyright Springer-Verlag Berlin Heidelberg.

Camenisch et al., "A Signature Scheme with Efficient Protocols", SCN 2002, LNCS 2576, pp. 268-289, 2003. Copyright Springer-Verlag Berlin Heidelberg 2003.

Pedersen, T., "Non-Interactive and Information-Theoretic Secure Verifiable Secret Sharing", Advances in Cryptology—CRYPTO '91, vol. 576 of the series Lecture Notes in Computer Science, pp. 129-140. Copyright Springer-Verlag Berlin Heidelberg. DOI: 10.1007/3-540-46766-1_9.

Damgard et al., "An Integer Commitment Scheme based on Groups with Hidden Order", BRICS, Dept. of Computer Science, Aarhus University and NTT Labs, 15 pages. Last accessed Dec. 31, 2015. http://webcache.googleusercontent.com/search?q=cache:hFOmQ2FDbn0J:https://eprint.iacr.org/2001/064.ps.gz+&cd=1&hl=en&ct=clnk&gl=us.

Unknown, "USB Dongle Backup and Recovery 2012", Dongle Service, Updated Feb. 11, 2014, last printed Apr. 29, 2015, 2 pages. http://www.dongleservice.com/dongle-emulator-signature.phtml.

Stajano, F., "Pico: No more passwords!", Proc. Security Protocols Workshop 2011, Springer LNCS, 35 pages. http://www.cl.cam.ac.uk/~fms27/papers/2011-Stajano-pico.pdf.

List of IBM Patents or Patent Applications Treated as Related, dated May 25, 2016, pp. 1-2.

* cited by examiner

REISSUE OF CRYPTOGRAPHIC CREDENTIALS

This invention relates generally to reissue of cryptographic credentials. Methods are provided for effecting reissue of cryptographic credentials in data processing systems, together with apparatus and computer programs for use in such methods.

Cryptographic credentials are widely used in cryptography-based applications to certify information which may need to be proved by a credential holder. A cryptographic credential is essentially a certificate generated via a cryptographic process. The credential is issued to a user by a credential issuing entity following appropriate verification of the information in question. This information is cryptographically encoded in the credential to certify the correctness of the information. In particular, the information to be certified can be represented by some value or function which is then encoded in the credential via a cryptographic algorithm. The items of information certified by a credential are commonly referred to as "attributes". Such an attribute can represent any item of information, relating, for instance, to some property, quality, feature or other item belonging to, describing or otherwise associated with a credential holder, about which proofs may need to be made. The credential holder can then use the credential to make proofs to a verifying entity, via various cryptographic proof protocols, about information encoded in the credential. Particular examples of credential applications include government or electronic ID cards certifying personal or other security-sensitive information about which proofs may need to be made by a user, e.g. to gain access to a service, facility or other resource controlled by a verifier.

A cryptographic credential is commonly bound to a secret cryptographic key such that use of the credential in a cryptographic proof protocol requires knowledge of the secret key. For security reasons, the secret key is often stored in a tamper-resistant processing device which can perform computations on the secret key to implement proof protocols but does not give direct access to the "naked" secret key itself. Such a tamper-resistant device employs some form of security mechanism to inhibit unauthorised access to the key. For example, the key may be stored in memory of a secure chip which is embedded in a smart card, USB (Universal Serial Bus) dongle, or other hardware device. This security measure prevents attackers from stealing the key and cloning the device, and also ensures that the user has physical access to the device when using the credential. At the same time, however, this mechanism prevents honest users from making backup copies of the stored key so that they can recover if the device is broken, lost, or stolen. Usually, the user must obtain a new device with a new secret key, and ideally have the old key revoked to prevent illegitimate use of the old device. This of course means that user credentials become unusable, since these are bound to the old key on the defunct device. Any so-called "state information" associated with the credential, such as transaction history, attributes, trusted statements about the device's state, or other trusted information, which may have been accumulated by the old device is also lost.

It would be desirable to allow users to recover from the above scenario. In particular, it would be desirable to allow credentials to be reissued to a user for use with a new device, without requiring the original credential issuing processes, with all the associated verification procedures, to be repeated. This, however, presents a significant problem with regard to privacy and security of information certified by credentials. In particular, it is generally required that credentials are issued and used in a way which avoids unnecessary disclosure of information. More particularly, credentials are generally issued and used in proof protocols in such a manner that no information is revealed to the issuer/verifier than that which is specifically to be proved for the purpose at hand. So-called "anonymous credentials", for instance, can be issued without revealing to the issuer attributes which must be encoded in the credential. The issuer can blindly certify attributes in a credential based on zero-knowledge proofs that those attributes are also contained in another valid credential bound to the user's secret key. For this purpose, the attributes in question can be presented to the issuer in so-called "blinded" form whereby the attribute is hidden by encoding it in a cryptographic function. In this way, a new, secondary credential can be issued for the same key as an existing, primary credential which is already held by the user. This procedure relies on user possession of the secret key, it being fundamental to the issuing process that the key is inherently carried over into the secondary credential so that the primary and secondary credentials are bound to the same secret key.

How to obtain reissue of a credential, without disclosing private information and without possession of the associated secret key, presents a problem. It would be desirable to allow credentials to be reissued to users in such circumstances while preserving an appropriate level of privacy.

One embodiment of an aspect of the present invention provides a method for effecting reissue, by a credential issuer of a data processing system, of a cryptographic credential certifying a set of attributes, the credential being initially bound to a first secret key stored in a first tamper-resistant processing device. The method comprises:

producing a backup token using the first tamper-resistant processing device, the backup token comprising a commitment to said set of attributes and first proof data permitting verification that the set of attributes in said commitment corresponds to the set of attributes certified by said credential;

storing the backup token in backup memory;

at a second tamper-resistant processing device storing a second secret key, blinding the second secret key to produce a blinded key;

producing a credential template token comprising the backup token and the blinded key;

sending the credential template token to the credential issuer via user apparatus of the data processing system; and at the credential issuer, performing said verification using the first proof data and using the credential template token to provide a reissued credential, certifying said set of attributes, to the second tamper-resistant device via said user apparatus, the reissued credential being bound to the second secret key.

Methods embodying this invention allow cryptographic credentials to be reissued for use with a new tamper-resistant processing device while preserving a desired level of privacy. A credential user whose secret key is protected by a first tamper-resistant processing device can protect against loss or breakage of that device by using the device to create a backup token. The backup token includes a commitment to a set of (one or more) attributes certified by the credential. (The concept of commitment is fundamental in cryptography applications and essentially involves use of a cryptographic function to generate a cryptographic value (the commitment) which encodes a value (or values) to which the provider wants to commit. Cryptographic proofs can then be made about the value in the commitment without revealing the value itself). The backup token also includes first proof data permitting verification, subsequently by the credential issuer, that the set of attributes in the commitment corresponds to the set of attributes certified by the credential. The backup token is stored in backup memory for retrieval if the credential needs to be reissued. In this event, the credential holder obtains a new, second tamper-resistant device which stores a second secret key. To initiate reissue of the credential, the second device blinds the second secret key to produce a blinded key. This is used with the backup token to produce a credential template token which is then sent to the credential issuer via user apparatus of the data processing system. The credential issuer can use the first proof data for the aforementioned verification of the (hidden) attributes, and then use credential template token to provide a reissued credential, certifying the set of attributes, to the new tamper-resistant device via the user apparatus. The reissued credential is bound to the second secret key based on the blinded key in the credential template token, so that the reissued credential can be used with the new tamper-resistant device. The credential template token thus essentially provides a template for the new credential which can be issued on satisfactory verification of the proof data by the credential issuer. The original credential is thereby reissued to the holder, allowing continuation of use with the new secret key, without the attributes being disclosed to the issuer.

In some embodiments, the credential issuer may provide the reissued credential to the second tamper-resistant device by sending the credential per se. In other embodiments, the credential issuer could send information which can be used at the tamper-resistant device to construct the final credential. A particular example of this is described below.

In general, the credential issuer may be implemented by any form of device, component or system for issue of cryptographic credentials in a data processing system. The user apparatus provides an interface between the tamper-resistant processing device and the issuer in the data processing system. While scenarios might be envisaged where this user apparatus is integrated in a hardware device with the tamper-resistant device, the user apparatus will typically be a separate apparatus, conveniently a user computer such as a general purpose personal computer (PC) for communication with the issuer over a data communications network.

The backup token may be produced by the first tamper-resistant device alone or by apparatus including that device. In some embodiments, therefore, the backup token is produced at the first tamper-resistant device. While such devices might be envisaged with a facility to connect directly to a backup memory for storage of the backup token, this token is conveniently stored in the backup memory by a user computer which is connected (directly or indirectly, via wired or wireless connections) to the first tamper-resistant device during a backup operation. In other embodiments, the backup token may be jointly produced by the first tamper-resistant device and a user computer connected to the first tamper-resistant device. For example, the device and user computer may each perform certain computations involved in generating the backup token. The backup token can then be stored in the backup memory by the user computer. The credential template token may similarly be produced at the second tamper-resistant device, or this token may be produced by the second tamper-resistant device and a user computer connected to the second tamper-resistant device. The user computer in these embodiments could be implemented in general by any convenient computing device such as a general-purpose PC, mobile phone, PDA (personal digital assistant), etc. Such a computer may or may not also implement the aforementioned user apparatus for sending the credential template token to the issuer.

In a preferred method, second proof data for demonstrating proof of knowledge of the second secret key is produced at the second tamper-resistant device, and this second proof data is included in the credential template token. The credential issuer then verifies the proof of knowledge using the second proof data before reissuing the credential.

Preferred embodiments also permit recovery of state data associated with the original credential and stored by the first tamper-resistant device. Such methods include:

at the first tamper-resistant device, producing from the credential and the state data a state token for authentication of the state data;

storing the state data and the state token in the backup memory;

sending the state data and the state token to the credential issuer; and at the issuer, verifying said authentication of the state data using the state token and providing the state data to the second tamper-resistant device for storage therein.

The invention also provides tamper-resistant processing devices for use in methods described above. In particular, an embodiment of a second aspect of the invention provides a tamper-resistant processing device for use as the second tamper-resistant processing device in a method according to the first aspect of the invention. The device comprises memory, storing the second secret key, and control logic adapted to:

blind the second secret key to produce the blinded key for use in said credential template token;

receive said reissued credential provided by the credential issuer via said user apparatus in response to sending of the credential template token to the credential issuer; and produce a backup token, comprising a commitment to said set of attributes and first proof data permitting verification that the set of attributes in said commitment corresponds to the set of attributes certified by the reissued credential, for storage in backup memory.

Tamper resistant devices embodying the second aspect of the invention thus provide functionality for obtaining a reissued credential and also producing a backup token in case that credential needs to be reissued. As described earlier, the backup token may be produced by the tamper-resistant device alone or in conjunction with a user computer.

An embodiment of a third aspect of the invention provides apparatus for use as said credential issuer in a method according to the first aspect of the invention. The apparatus comprises:

a communications interface for receiving said credential template token from said user apparatus; and control logic adapted to perform said verification using said first proof data in said backup token, and to use the credential template token to provide the reissued credential, certifying said set of attributes, to said second tamper-resistant device via the user apparatus, the reissued credential being bound to said second secret key.

The invention also provides a computer program comprising program code means for causing a computer to implement the control logic of a device according to the second aspect of the invention. The invention further provides a computer program comprising program code means for causing a computer to implement the control logic of apparatus according to the third aspect of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention as appropriate.

Figure 2A:
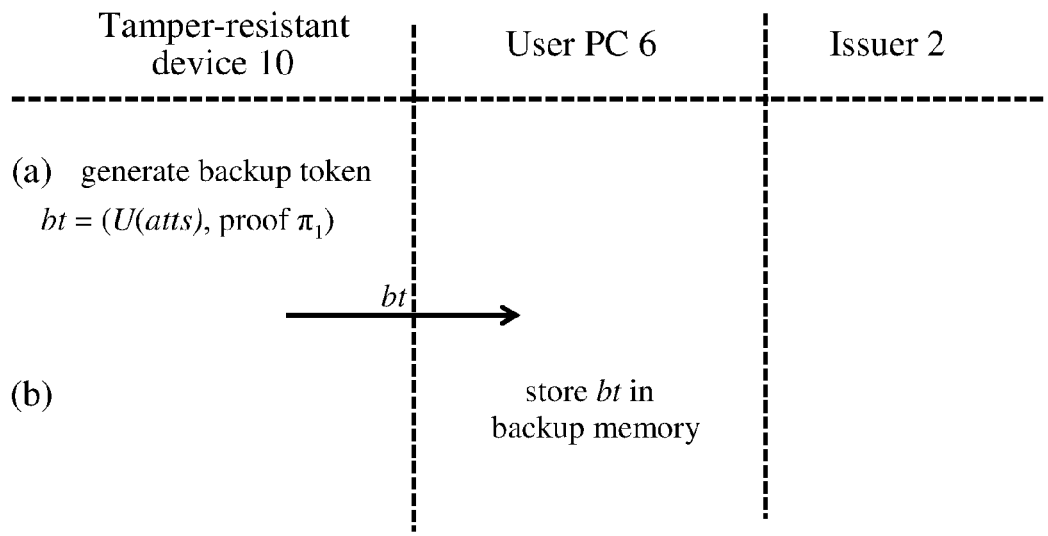
Figure 2B:
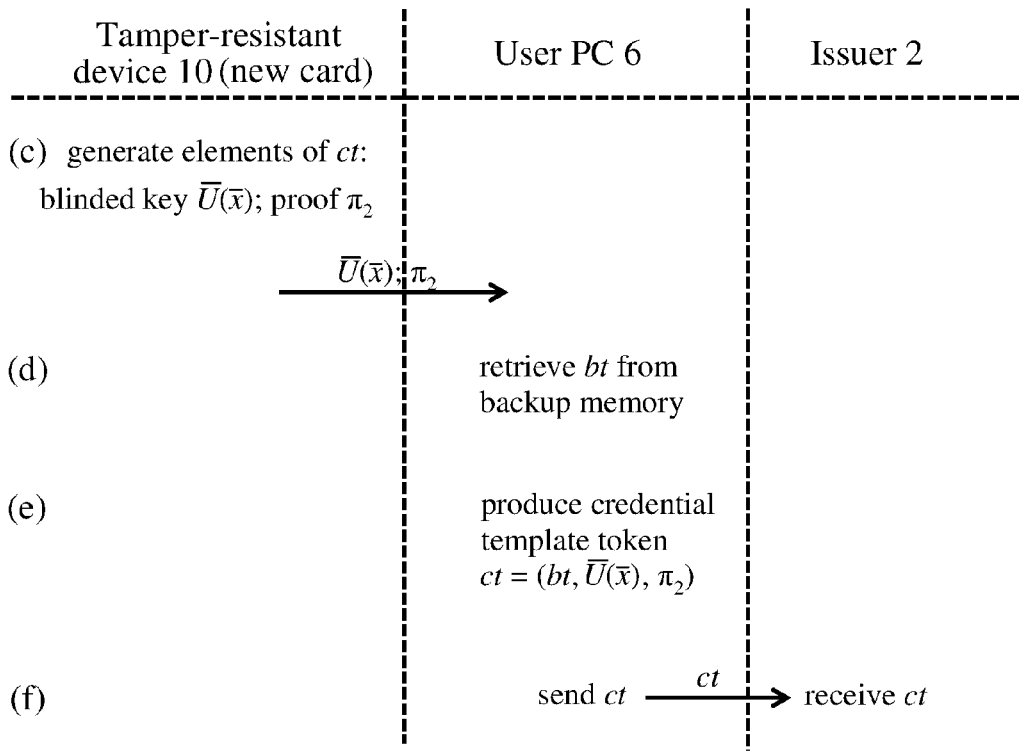
Figure 2C:
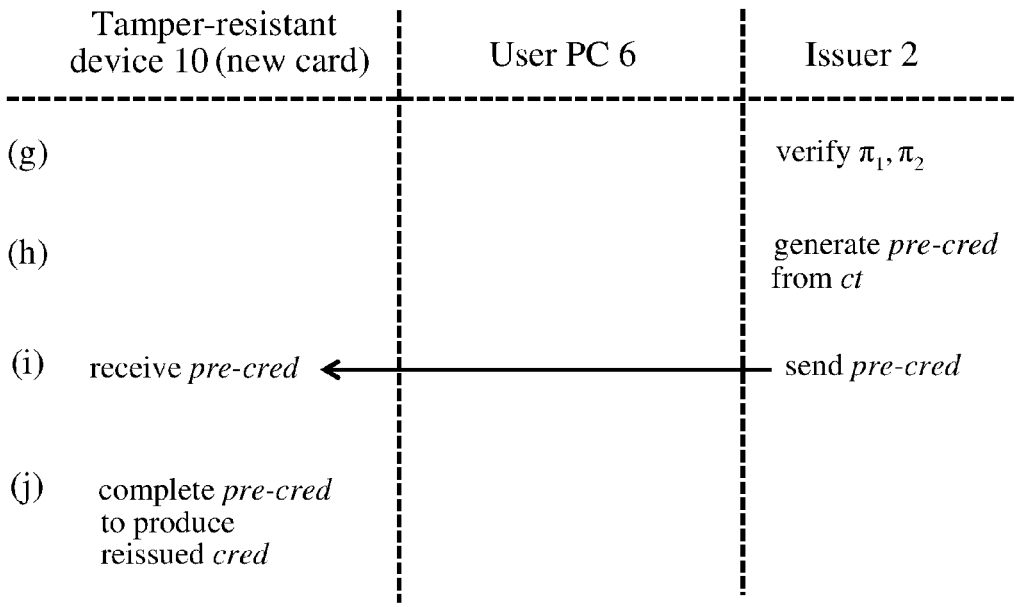
Figure 3:
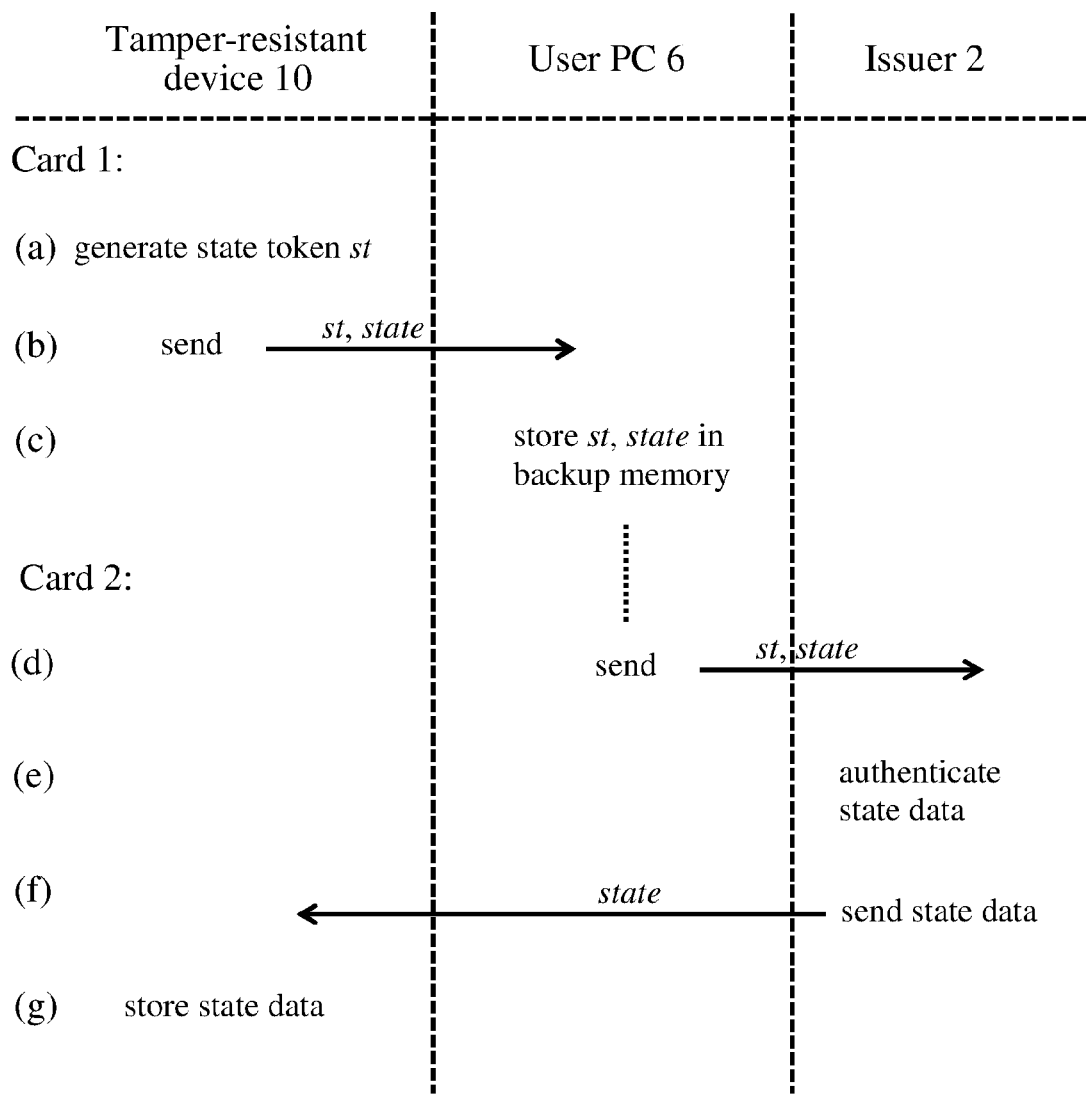

Preferred embodiments of the invention will now be described, by way of example, with reference to the accompanying drawings in which:

FIG. 1 is a schematic illustration of a data processing system in which cryptographic credentials can be reissued via a method embodying the invention;

FIGS. 2a to 2c indicate steps performed in operation of the credential reissue process; and FIG. 3 indicates steps performed to transfer state data on reissue of a credential.

FIG. 1 shows an exemplary data processing system 1 for implementing a credential reissue method embodying the invention. The system 1 includes credential issuer apparatus (the "issuer") 2 comprising a communications interface (I/F) 3 and issuer logic 4. Issuer logic 4 controls operation of issuer 2 generally and includes functionality for performing steps of the credential reissue process detailed below. The issuer 2 here may be embodied by a general purpose computer implementing a server for communication, via interface 3, with remote computers over a data communications network 5 (where network 5 may in general comprise one or more component networks or internetworks, including the Internet). The system 1 also includes user apparatus in the form of a user computer 6 which is implemented here by a general purpose PC. User PC 6 includes a communications interface 7 for communicating with issuer 2 over network 5, and credential logic 8 providing functionality for use in the credential reissue method to be described. System 1 further includes a tamper-resistant processing device 10. Tamper-resistant device 10 is implemented here by a secure chip of a smart card 11 which is issued to the user for storage and management of one or more cryptographic credentials. The device 10 comprises memory 12 and card control logic 13. Control logic 13 controls operation of device 10 generally and includes functionality for implementing various operations detailed below for use in reissue of cryptographic credentials. In use of smart card 11, control logic 13 can communicate with credential logic 8 of user computer 6 via a card interface (not shown) associated with user computer 6. Such a card interface can be of generally known form and may provide for wired or wireless communications between card 11 and computer 6.

In general, the card control logic 13, the issuer logic 4 and the credential logic 8 could be implemented in hardware or software or a combination thereof. In this example, credential logic 8 is conveniently implemented by a software application running on user PC 6 to support user operations with smart card 11. Control logic 13 is conveniently implemented by software for configuring a secure processor to perform the functions to be described. Similarly, issuer logic 4 is conveniently implemented by software for controlling issuer computer 2 to implement the functionality described below.

The device 10 is designed to inhibit unauthorised tampering, in particular to inhibit unauthorised reading of secure data or unauthorised interference with the processing functionality of the device. To this end, the chip implementing device 10 is physically embedded in card 11 and incorporates self-destructing data containers to prevent unauthorized access to data stored in memory 12. Control logic 13 (or at least the security-critical functionality thereof) is non-programmable by extraneous program code so that processing functionality is inaccessible to interference by malicious software.

The memory 12 of device 10 stores at least one credential (cred) previously issued to the user by the credential issuing entity associated with issuer apparatus 2. The credential certifies one or more user attributes, such as full name, a serial number or national identification number, date of birth, nationality, etc., about which cryptographic proofs can be made in use of the credential. The credential is typically a signature by the credential issuing entity under its own private (secret) key sk of a public/private cryptographic key pair (sk, pk). The signature can thus be authenticated by verifying entities using the corresponding public key pk. The credential cred is bound to a secret user key x stored in secure memory 12. The credential can be bound to the secret key via encoding of this key in the credential, i.e. the credential contains some value which is computed using the secret key. The secret key x can be used in computations by control logic 13 but is never revealed in itself in any communications with card 11. Memory 12 also stores state data associated with the credential. This state data may include the particular attributes encoded in the credential, information about transactions performed using the credential, information about the device's state generally, or any other trusted information generated in operation of the secure device. The state data can typically be read from memory 12 and output by device 10 if required, but this data can only be written (and hence modified) by secure operations of the device.

The method to be described for effecting reissue of credentials in system 1 allows the credential user to recover in the event that smart card 11 is stolen, lost or broken. The main steps in operation of this method are indicated in the diagrams of FIGS. 2a to 2c. These diagrams indicate the interaction between tamper-resistant device 10, user PC 6 and issuer 2 whose individual operations are indicated respectively in the left-hand, central and right-hand columns of the figures. A preliminary stage of the credential reissue process is illustrated in FIG. 2a. In this stage, a backup operation is performed to permit later reissue of the credential if card 11 becomes inaccessible for some reason. In step (a) of this process, control logic 13 of device 10 generates a backup token bt via a token generation algorithm:

$$bt \leftarrow \text{BackupTokenGen}(cred, x, atts).$$

This algorithm takes as inputs the credential cred stored in memory 12, the secret key x, and the set of attributes atts encoded in the credential and typically stored as part of the state data described above. The resulting backup token bt contains a commitment U(atts) to the set of attributes and first proof data $\pi_1$ which permits later verification by issuer 2 that the set of attributes in the commitment U corresponds to the set of attributes certified by the credential. A particular example of the backup token generation algorithm will be given below. The backup token bt is transmitted by device 10 to credential logic 8 of user PC 6. In step (b) of the FIG. 2a process, credential logic 8 stores the backup token bt in a convenient backup memory as represented by removable disc 14 in FIG. 1. The initial credential backup process is then complete.

The next stage of the reissue procedure is performed as required by a user when smart card 11 becomes inaccessible for some reason so that the credential cred can no longer be used. In this event, the user obtains a new smart card 11. The new card 11 is substantially identical to the old card described above apart from the data stored in memory 12. In particular, the new card 11 will contain a new secret key $\bar{x}$ but will not yet contain a user credential or associated state data. FIG. 2b indicates the steps performed to initiate reissue of the credential cred to the new card. In step (c) of this figure, the control logic 13 of the new card generates cryptographic elements to be included in a credential template token described below. In particular, control logic 13 blinds the secret key $\bar{x}$ to produce a blinded version $\bar{U}(\bar{x})$ of the key. In addition, control logic 13 generates second proof data $\pi_2$ for demonstrating to issuer 2 proof of knowledge of the secret key $\bar{x}$ by control logic 13. The blinded key $\bar{U}(\bar{x})$ and proof data $\pi_2$ are then sent by device 10 to credential logic 8 of user PC 6. In step (d) of FIG. 2b, the credential logic 8 retrieves the backup token bt from the backup memory 14 which is connected by the user to PC 6 if necessary. In step (e), credential logic 8 combines backup token bt with the elements received from device 10 to produce a credential template token ct. The credential template token ct thus comprises the backup token bt (which contains U(atts) and proof $\pi_1$), the blinded key $\bar{U}(\bar{x})$ and the proof $\pi_2$). The elements U(atts) and $\bar{U}(\bar{x})$ in this token effectively provide a template for the credential to be reissued to the user as illustrated in the detailed embodiment below. In step (f), the credential template token ct is sent by user PC 6 to the credential issuer 2 after establishing a connection to the issuer over network 5. The credential template token ct is thus received by issuer logic 4 of issuer 2.

The next stage of the reissue procedure is illustrated in FIG. 2c. In step (g) of this figure, the issuer logic 4 accepts or rejects the credential template token based on a verification algorithm:

accept/reject←TemplateTokenVf(pk,ct)

whose inputs are the token ct and the issuers own public key pk corresponding to its secret key sk used to generate the credential as discussed earlier. In particular, the issuer logic uses the first proof data $\pi_1$ and its own public key pk to verify that the blinded attributes in the commitment U(atts) are the same values as the attributes in the old credential cred. Issuer logic 4 also uses proof data $\pi_2$ to verify proof of knowledge by card control logic 13 of the secret key $\bar{x}$ in the blinded value $\bar{U}(\bar{x})$. On satisfactory outcome of these verification procedures, the credential template token ct is accepted. In step (h) of FIG. 2c, issuer logic 4 then uses information in the token ct to generate a cryptographic element for providing a reissued credential to card 11. This element is referred to herein as a "pre-credential" (pre-cred). The pre-credential can be used by card 11 to produce the final, usable credential by inclusion of a value known to the card control logic 13. A particular example of such a pre-credential will be given in the detailed embodiment below. The pre-credential encodes the attributes atts by incorporating information from the backup token bt, and incorporates the blinded key $\bar{U}(\bar{x})$ to bind the pre-credential to the new secret key $\bar{x}$ in card 11. In step (i) of FIG. 2c, the issuer logic 4 sends the pre-credential to the card control logic 13 via user PC 6. On receipt, control logic 13 completes the pre-credential in step (j) to obtain the final, reissued credential which is then stored in card memory 12. As a result of this process, the new card 11 receives a reissued credential, encoding the same attributes as the original credential but bound to the new secret key $\bar{x}$. This reissued credential is thus provided by issuer 2, via provision of the pre-credential pre-cred, without the issuer learning either the new key $\bar{x}$ or any of the attributes encoded in the credential.

On completion of the reissue procedure above, the user can continue use of the credential with the new card 11. At any subsequent time, the user can make a further backup via the procedure of FIG. 2a to protect against loss or damage of the new card necessitating further reissue of the credential.

An exemplary implementation of the foregoing credential reissue process is described in detail in the following. The process to be described employs cryptographic techniques of an anonymous credential system based on Camenisch-Lysyanskaya signatures. A brief description of properties of Camenisch-Lysyanskaya signatures will be given first to assist understanding of the embodiment to be described.

Discrete-Logarithm-Based, Zero-Knowledge Proofs

In the common parameters model, we use several known results for proving statements about discrete logarithms such as: (1) proof of knowledge of a discrete logarithm modulo a prime or a composite; (2) proof of knowledge of equality of representation modulo two (possibly different) prime or composite moduli; (3) proof that a commitment opens to the product of two other committed values; (4) proof that a committed value lies in a given integer interval; and (5) proof of the disjunction or conjunction of any two of the previous proofs. These protocols modulo a composite are secure under the strong RSA (Rivest, Shamir, Adleman) assumption and modulo a prime under the discrete logarithm assumption.

When referring to the proofs above, we will follow the notation introduced by Camenisch and Stadler ("Efficient Group Signature Schemes for Large Groups", J. Camenisch and M. Stadler, in B. Kaliski, editor, Advances in Cryptology—CRYPTO '97, volume 1296 of Lecture Notes in Computer Science, pages 410-424, Springer Verlag, 1997) for various proofs of knowledge of discrete logarithms and proofs of the validity of statements about discrete logarithms. For instance, $$PK\{(\alpha,\beta,\delta):y=g^\alpha h^\beta \wedge \tilde{y}=\tilde{g}^\alpha \tilde{h}^\delta \wedge (u \leq \alpha \leq v)\}$$

denotes a "zero-knowledge Proof of Knowledge of integers $\alpha$, $\beta$, and $\delta$ such that $y=g^\alpha h^\beta$ and $\tilde{y}=\tilde{g}^\alpha \tilde{h}^\delta$ holds, where $u \leq \alpha \leq v$", and where y, g, h, $\tilde{y}$, $\tilde{g}$, $\tilde{h}$ are elements of some groups $G=\langle g \rangle=\langle h \rangle$ and $\tilde{G}=\langle \tilde{g} \rangle=\langle \tilde{h} \rangle$. The convention is that Greek letters denote quantities of which knowledge is being proved, whereas all other values are known to the verifier. The Fiat-Shamir heuristic ("How to prove yourself: Practical solutions to identification and signature problems", A. Fiat and A. Shamir, in A. M. Odlyzko, editor, Advances in Cryptology—CRYPTO '86, volume 263 of Lecture Notes in Computer Science, pages 186-194. Springer Verlag, 1987) can be applied to turn such proofs of knowledge into signatures on some message m; this is denoted as, for example, SPK{($\alpha$): $y=g^\alpha$}(m). In this way, the prover's participation in the proof process is effectively condensed into a cryptographic function (the "signature proof of knowledge" (SPK)) for communication to a verifier who can use the signature proof of knowledge to complete the proof without further interaction with the prover. Given a protocol in this notation, it is straightforward to derive an actual protocol implementing the proof, and suitable protocols for the following embodiment will be readily apparent to those skilled in the art.

Camenisch-Lysyanskaya Signatures

Camenisch-Lysyanskaya signatures are described in detail in: "A Signature Scheme with Efficient Protocols", J. Camenisch and A. Lysyanskaya, in S. Cimato, C. Galdi and G. Persiano editors, Security in Communications Networks, Third International Conference, SCN 2002, volume 2576 of Lecture Notes in Computer Science, pages 268-289, Springer Verlag, 2003. We present a straightforward variant that allows messages to be negative integers as well. Let $l_m$, $l_e$, $l_n$, $l_r$ and L be system parameters. $l_r$ is a security parameter, and the meanings of the others will become apparent in the following.

We denote the set of integers $\{-(2^{l_m}-1), \ldots, (2^{l_m}-1)\}$ by $\pm\{0,1\}^{l_m}$. Elements of this set can thus be encoded as binary strings of length $l_m$, plus an additional bit carrying the sign, i.e., $l_m+1$ bits in total.

Key generation: on input $l_n$, choose an $l_n$-bit RSA modulus n such that n=pq, p=2p'+1, q=2q'+1, where p, q, p', and q' are primes. Choose, uniformly at random, $R_0, \ldots R_{L-1}$, S, Z∈QRn. Output the public key (n, $R_0, \ldots, R_{L-1}$, S, Z) and the secret key p.

Message space is the set $\{(m_0, \ldots, m_{L-1})\}: m_i \in \pm\{0,1\}^{l_m}$.

Signing algorithm: on input $m_0, \ldots, m_{L-1}$, choose a random prime number e of length $l_e > l_m + 2$, and a random number v of length $l_v = l_n + l_m + l_r$, where $l_r$ is a security parameter. Compute $$A = \left(\frac{Z}{R_0^{m_0} \ldots R_{L-1}^{m_{L-1}} S^v}\right)^{\frac{1}{e}} \bmod n.$$

The signature consists of (e, A, v).

Verification algorithm: to verify that the tuple (e, A, v) is a signature on message ($m_0, \ldots, m_{L-1}$), check that the following statements hold:

$Z \equiv A^e R_0^{m_0} \ldots R_{L-1}^{m_{L-1}} S^v \pmod{n}$, $m_i \in \pm\{0,1\}^{l_m}$ and $2^{l_r} > e > 2^{l_e-1}$ Proving Knowledge of a Signature A prover can prove possession of a CL signature without revealing any other information about the signature. If A was a public value, we could do so by proving knowledge representation of Z with respect to $R_0, \ldots, R_{L-1}$, S and A. However, making A public would destroy privacy as that would make all transactions linkable. Luckily, one can randomize A: given a signature (A, e, v), the tuple (A':=AS$^{-r}$ mod n, e, v':=v+er) is also a valid signature. Now, provided that A∈⟨S⟩ and that r is chosen uniformly at random from $\{0,1\}^{l_n+l_\varphi}$ the value A' is distributed statistically close to uniform over $Z^*_n$. Thus, the user could compute a fresh A' each time, reveal it, and then run the following protocol with the verifier:

$PK\{(\epsilon,\nu',\mu_0, \ldots ,\mu_{L-1}): Z \equiv \pm R_0^{\mu_0} \ldots R_{L-1}^{\mu_{L-1}} A^\epsilon S^{\nu'}$
$\pmod{n}\} \mu_i \in \pm\{0,1\}^{l_m}\} \epsilon \in [2^{l/3-1}+1, 2^{l_e}-1]\}$ Now, there is a technical consequence from this proof protocol regarding the statements $\mu_i \in \pm\{0,1\}^{l_m}\} \epsilon \in [2^{l_e-1}+1, 2^{l_e}-1]$. Although these can be implemented virtually for free, they require that the secret actually lies in a smaller interval, i.e. the signer needs to choose e from $[2^{l_e-1}-2^{l'_e}+1, 2^{l_e-1}+2^{l'_e}-1]$ with $l'_e < l_e - l_\varphi - l_H - 3$ where $l_\varphi$ and $l_H$ are security parameters (the first controlling statistical zero-knowledge and the second being the size of the challenge message in the PK protocol). Similarly, we require that the size of the message input to the signature scheme is limited: $m_i \in \pm\{0,1\}^{l_m-l_\varphi-l_H-2}$. As the proofs can only guarantee that the absolute value of the messages are smaller than $2^{l_m}$, we also include negative messages in the message space for consistency. Finally, we note that in $Z \equiv \pm R_0^{\mu_0} \ldots R_{L-1}^{\mu_{L-1}} A^{l_S} S^{\nu'} \pmod{n}$ there appears a "±". This is a technicality in the proofs of knowledge in RSA groups: because of the group structure of $Z^*_n$ and its sub-group $QR_n$ over a special RSA modulus n, there exist small-order subgroups which may allow a prover to include a multiple of small known order as well as to prove a statement for the negation with probability ½. This is not a problem for the application at hand, however, because e (being an odd prime by definition) maintains the negation and allows a reduction to the strong RSA assumption in this case.

(Integer) Commitments

In the Pedersen commitment scheme (as detailed in "Non-interactive and Information-theoretic Secure Verifiable Secret Sharing", T. P. Pedersen, in J. Feigenbaum, editor, Advances in Cryptology—CRYPTO '91, volume 576 of Lecture Notes in Computer Science, pages 129-140, Springer Verlag, 1992) we have a group G of prime order q, and generators ($g_0, \ldots, g_m$) as public parameters. To commit to the values $(v_1, \ldots, v_m) \in Z_q^m$, pick a random $r \in Z_q$ and set $C = Com(v_1, \ldots v_m; r) = g_0^r \prod_{i=1}^m g_i^{v_i}$.

Damgård and Fujisaki ("An integer commitment scheme based on groups with hidden order", I. Damgård and E. Fujisaki, http://eprint.iacr.org/2001,2001) show that if the group G is an RSA group and the committer is not privy to the factorization of the modulus, then the Pedersen commitment scheme can be used to commit to integers of arbitrary size.

The following describes an embodiment of the credential reissue process of FIGS. 2a to 2c based on the cryptographic principles set out above.

The original credential cred, bound to secret key x on first smart card 11, is assumed to have attributes $a_1, \ldots, a_{L-2}$. This credential is a signature (e, A, v) by the credential issuer so that $Z \equiv A^e R_0^x R_1^r R_2^{a_1} \ldots R_{L-1}^{a_{L-2}} S^v \pmod{n}$, $m_i \in \pm\{0,1\}^{l_m}$
and $2^{l_e} > e > 2^{l_e-1}$ holds, where r is some revocation information. (Z, $R_0, \ldots R_{L-1}$, S, n) constitutes the issuer's public key pk. This credential is issued to the smart card user such that x is not revealed to the issuer.

To generate the backup token bt in step (a) of FIG. 2a, control logic 13 computes the commitment:

$U = R_2^{a_1} \ldots R_{L-1}^{a_{L-2}} S^{v'} \pmod{n}$ with v' randomly chosen. In addition, control logic 13 computes the first proof data $\pi_1$ as a signature proof of knowledge:

$\pi_1 = SPK\{(\epsilon,\nu,\nu',\mu_0, \ldots ,\mu_{L-1}):$ $ZR_1^{-r} \equiv \pm R_0^{\mu_0} R_2^{\mu_1} \ldots R_{L-1}^{\mu_{L-1}} A^\epsilon S^{\nu'} \pmod{n}\rangle$ $U = R_2^{\mu_1} \ldots R_{L-1}^{\mu_{L-1}} S^{\nu'} \pmod{n}$ $\mu_i \in \pm\{0,1\}^{l_m}\} \epsilon \in [2^{l_e-1}+1, 2^{l_e}-1]\}(U,r).$ The backup token bt=(U, r, $\pi_1$).

In step (c) of FIG. 2b, control logic 13 of the new card computes the blinded key as:

$$\overline{U} = R_Q^{\overline{s}} S^{v''}$$

for randomly chosen $v''$. In addition, control logic 13 computes the second proof data $\pi_2$ as a signature proof of knowledge:

$$\pi_2 = SPK\{(\overline{\zeta}, \overline{v}) : \overline{U} = R_Q^{\overline{\zeta}} S^{\overline{v}} \bmod n\}\overline{\zeta} \in \pm\{0,1\}^{l_m}\}(\overline{U}).$$

The credential template token ct produced in step (e) of FIG. 2b is:

$$ct = (bt, \overline{U}, \pi_2)$$
$$= (U, \overline{U}, r, \pi_1, \pi_2).$$

In step (g) of FIG. 2c, the issuer logic 4 verifies the signature proofs $\pi_1$, $\pi_2$ using the techniques discussed above. The revocation information r is used by issuer logic 4 to revoke the original credential and then reissue the credential as follows. First the issuer logic 4 chooses a random integer $\overline{v}'$ and a random prime $\overline{e}$. In step (h) of FIG. 2c, the issuer logic computes $$\overline{A} = \left(\frac{Z}{U\overline{U} \ldots R_1^{\overline{r}} S^{\overline{v}'}}\right)^{\frac{1}{\overline{e}}}$$

where $\overline{r}$ is the new revocation information, and produces the pre-credential as $$\text{pre-cred} = (\overline{A}, \overline{r}, \overline{v}', \overline{e}).$$

This is sent to the card control logic 13 in step (i) of FIG. 2c. In step (j) of FIG. 2c, the control logic 13 calculates $\overline{v} = (\overline{v}' + \overline{v}'' + \overline{v}')$ and obtains the reissued credential as $$\text{reissued cred} = (\overline{A}, \overline{e}, \overline{v}).$$

The reissued credential is bound to the new secret key $\overline{x}$. The credential template token ct in the above process thus provides the information the issuer needs to reissue the credential for use with the new secret key. The elements U $\overline{U}$ of the token ct effectively provide a template for the pre-credential signature and hence for the reissued credential.

It will be seen that the above process allows a credential which is bound to a secret key x on an inaccessible smart card to be reissued to a user, allowing continued use with a new secret key on a new card, while preserving user privacy. In particular, the credential is reissued without the new key or the attributes certified by the credential being disclosed to the issuer.

Preferred embodiments also provide for recovery of state data stored on the first card 11. The main steps of this procedure are indicated in FIG. 3. Step (a) of this process is performed when the user is in possession of the first card in order to backup accumulated state data. This step can be performed at the same time as creation of the backup token in the credential reissue process above. In this step, the control logic 13 of the first card creates a state token st via a token generation algorithm:

st ← StateTokenGen(cred, state).

This algorithm takes as inputs the state data state to be protected and the credential cred which is used to authenticate the state data in the resulting token. In step (b) of the state backup process, the state token st is transmitted by device 10, together with a full copy of the state data state, to credential logic 8 of user PC 6. In step (c), the credential logic 8 stores the received data (st, state) in the backup memory 14. The initial state backup process is then complete.

The next stage of the state recovery procedure is performed as required by a user to recover the state for a use with the reissued credential on a new smart card 11. This process could be performed following reissue of the credential or in parallel with the credential reissue process. In step (d) of the FIG. 3 process, the credential logic 8 of user PC 6 sends the state token and state data (st, state) retrieved from the backup memory to the credential issuer 2. On receipt by the issuer in step (e) of the process, the issuer logic 4 checks the authentication of the state data by the state token, accepting or rejecting the state token accordingly, based on a verification algorithm accept/reject ← StateTokenVf(pk, st)

whose inputs are the token st and the issuers public key pk corresponding to its secret key sk used to generate the credential cred. On satisfactory outcome of the verification procedure, the issuer logic sends the state data to new card 11, via user PC 6, in step (f) of FIG. 3. The state data is received by card control logic 13 and stored in secure memory 12 in step (g). The state recovery process is then complete. The state data is thus made available for use in association with the reissued credential, while the verification procedure ensures that only state data which was validly stored on the old smart card is transferred to the replacement card. Suitable algorithms for use in this process will be readily apparent to those skilled in the art based on the cryptographic techniques detailed earlier.

Note that not all state data need be included in the state data sent to the issuer in the above process. In particular, attributes included in the original state data can be omitted to preserve privacy of the attributes. Attributes included in the backed-up state data may be supplied directly to the new tamper-resistant device 10 for storage, these attributes being certified by the reissued credential which thus prevents use of falsely-claimed attributes. Alternative embodiments can also be envisaged wherein state data is sent to the issuer in an encrypted form such that only the new tamper-resistant device 10 can decrypt this information following verification and return by the issuer.

The credential reissue process described above may be performed as required for all credentials stored in a tamper-resistant device 10. For example, if a card stores a primary credential and one or more secondary credentials bound to the same secret key, the procedure described can be performed for each credential individually. In alternative embodiments, however, secondary credentials could be issued such that they encode the appropriate attributes from the primary credential but do not encode the secret key bound to the primary credential. In such embodiments, the primary credential could be recovered via the credential reissue process described, while and secondary credentials could be treated as part of the state data and transferred to the new device via the state recovery process of FIG. 3.

Numerous changes and modifications can be made to the specific embodiments described above. For example, embodiments can be envisaged where some of the attributes atts certified by a credential are stored externally of the secure device 10, e.g. in user PC 6. In this case, computations specific to those attributes may be performed by user PC 6. Tokens in the above procedures may therefore be computed jointly by device 10 and user PC 6, with the secure device performing all computations involving the secret key in memory 12. Such sharing of computations may be of particular use where processing capabilities of device 10 are limited.

In a modification to FIG. 2b, the backup token bt could be supplied by the user PC to card control logic 13 which then generates the credential template token ct. In general in embodiments of the invention, tokens and credentials might include other elements than those specifically mentioned above. A reissued credential may certify the attributes atts and any other information which may desirably be included by the credential issuer. Also, in the state recovery procedure, the issuer might in general provide the state data to the new device by sending the state data to the new device or by otherwise facilitating storage of the state data by the new device following authentication of the state token.

Various other forms of data processing system 1 can of course be envisaged, and the particular form of the issuer apparatus, user apparatus and tamper-resistant device is largely irrelevant to the cryptographic functions described. The user apparatus, for instance, might be implemented by another type of user computer such as a mobile phone, PDA, etc. Embodiments might also be envisaged where the user apparatus comprises a dedicated device such as a terminal device accessible to the user and specifically for communicating with the issuer.

In general, a credential user might be a person or a device by which proofs may need to be made about information certified in a credential. Also, while the credential is stored with the secret key in secure memory of device 10 above, alternatives can be envisaged. For example, the credential might be stored separately of the key, or the credential might be only partially stored in device 10 and partially stored elsewhere, e.g. in a user computer 6. The tamper-resistant device might be incorporated, in general, in any desired hardware device, whether a dedicated hardware device such as a card or dongle or apparatus having additional functionality. In some embodiments, the tamper-resistant device might be implemented in a SIM (subscriber identity module) card for a mobile phone which provides the user computer 6.

It will be appreciated that many other changes and modifications can be made to the exemplary embodiments described without departing from the scope of the invention.

What is claimed is:

1. A method for effecting reissue of a cryptographic credential certifying a set of attributes, the credential being initially bound to a first secret key stored in a first tamper-resistant processing device, the method comprising:
   producing a backup token using the first tamper-resistant processing device, the backup token comprising a commitment to said set of attributes and first proof data permitting verification that the set of attributes in said commitment corresponds to the set of attributes certified by said credential;
   storing the backup token in backup memory;
   receiving, from a second tamper-resistant processing device storing a second secret key, a blinded key, the blinded key produced by the second tamper-resistant device by blinding the second secret key;
   producing a credential template token comprising the backup token and the blinded key;
   sending the credential template token to a credential issuer;
   receiving, from the credential issuer, a pre-credential, the pre-credential generated by the credential issuer in response to the credential issuer verifying the credential template token, the pre-credential generated using information in the credential template token; and
   sending the pre-credential to the second tamper-resistant device, wherein the second tamper-resistant device is configured to complete the pre-credential to produce a reissued credential, the reissued credential bound to the second secret key.

2. The method of claim 1, further comprising:
receiving, from the second tamper-resistant processing device, second proof data for demonstrating proof of knowledge of the second secret key, wherein the credential template token further comprises the second proof data.

3. The method of claim 1, wherein the first tamper-resistant device stores data associated with the credential, the method further comprising:
   receiving, from the first tamper-resistant device, state data and a state token, the state token produced by the first tamper-resistant device from the credential and the state data, the state token for authentication of the state data;
   storing the state data and the state token in the backup memory;
   sending the state data and the state token to the credential issuer;
   receiving the state data from the credential issuer based on acceptance of the state token by the credential issuer; and
   sending the state data to the second tamper-resistant processing device.

4. The method of claim 1, wherein the credential is an anonymous credential.

5. A system for effecting reissue of a cryptographic credential certifying a set of attributes, the credential being initially bound to a first secret key stored in a first tamper-resistant processing device, the system comprising:
   a second tamper-resistant device having a first memory and card control logic, the first memory storing a second secret key; and
   a first computing system in communication with the second tamper-resistant device, the computing system having a communications interface and credential logic, wherein the card control logic and the credential logic are configured to cause the system to perform a method comprising:
   blinding the second secret key to produce a blinded key;
   producing a credential template token comprising a backup token and the blinded key, the backup token stored in a backup memory, the backup token comprising a commitment to said set of attributes and first proof data permitting verification that the set of attributes in said commitment corresponds to the set of attributes certified by said credential, the backup token produced using the first tamper-resistant device;
   sending, using the communications interface, the credential template token to a credential issuer;
   receiving, using the communications interface, a pre-credential from the credential issuer, the pre-credential generated by the credential issuer in response to the credential issuer verifying the credential template token, the pre-credential generated using information in the credential template token; and
   completing the pre-credential to produce a reissued credential, the reissued credential bound to the second secret key.

6. The system of claim 5, wherein the credential template token is produced at the second tamper-resistant device.

7. The system of claim 5, wherein the credential template token is produced by the second tamper-resistant device and the first computing system.

8. The system of claim 5, wherein the method further comprises:
   at the second tamper-resistant device, producing second proof data for demonstrating proof of knowledge of the second secret key, wherein the credential template token includes the second proof data.

9. The system of claim 5, wherein a state token and state data are stored in the backup memory, the state token produced from the credential and the state data using the first tamper-resistant device, and wherein the method further comprises:
   sending the state data and the state token to the credential issuer;
   receiving the state data from the credential issuer based on acceptance of the state token by the credential issuer; and
   storing the state data in the first memory.

10. The system of claim 5, wherein the credential is an anonymous credential.

11. A system for effecting reissue of a cryptographic credential certifying a set of attributes, the credential being initially bound to a first secret key stored in a first tamper-resistant processing device, the system comprising:
   a second tamper-resistant device having a first memory and card control logic, the first memory storing a second secret key; and
   a user apparatus in communication with the second tamper-resistant device, the user apparatus having a first communications interface and credential logic; and
   a credential issuer having a second communications interface and issuer logic, wherein the card control logic, the credential logic, and the issuer logic are configured to cause the system to perform a method comprising:
      at the second tamper-resistant device, blinding the second secret key to produce a blinded key;
      producing a credential template token comprising a backup token and the blinded key, the backup token stored in a backup memory, the backup token comprising a commitment to said set of attributes and first proof data permitting verification that the set of attributes in said commitment corresponds to the set of attributes certified by said credential, the backup token produced using the first tamper-resistant device;
      sending the credential template token to a credential issuer via the first communication interface; and
      at the credential issuer, performing said verification using the first proof data and using the credential template token to provide a reissued credential, certifying said set of attributes, to the second tamper-resistant device via the user apparatus.

12. The system of claim 11, wherein the credential template token is produced at the second tamper-resistant device.

13. The system of claim 11, wherein the credential template token is produced by the second tamper-resistant device and the first computing system.

14. The system of claim 11, wherein the method further comprises:
   at the second tamper-resistant device, producing second proof data for demonstrating proof of knowledge of the second secret key, wherein the credential template token includes the second proof data; and
   at the credential issuer, verifying said proof of knowledge using the second proof data.

15. The system of claim 11, wherein providing the reissued credential to the second tamper-resistant device comprises sending a pre-credential for completion by the second tamper-resistant device to produce the reissued credential.

16. The system of claim 11, wherein a state token and state data are stored in the backup memory, the state token produced from the credential and the state data using the first tamper-resistant device, and wherein the method further comprises:
   sending the state data and the state token to the credential issuer; and
   at the credential issuer, verifying said authentication of the state data using the state token and providing the state data to the second tamper-resistant device for storage therein.

17. The system of claim 11, wherein the credential is an anonymous credential.

* * * * *